July 23, 1946.    P. H. VALENTYNE    2,404,765
SELF-LOCKING VENT SYSTEM
Filed June 12, 1945    3 Sheets-Sheet 1
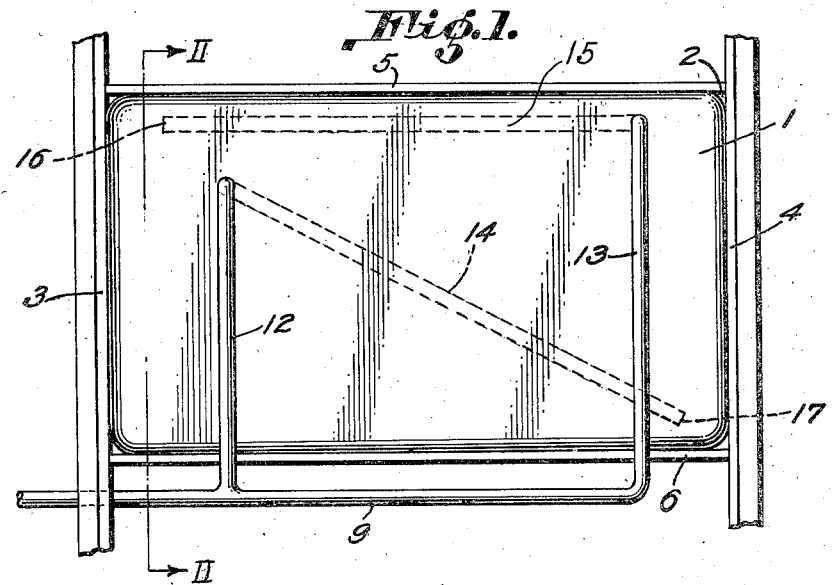
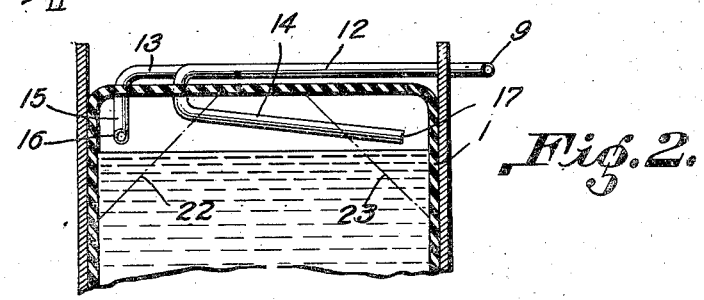
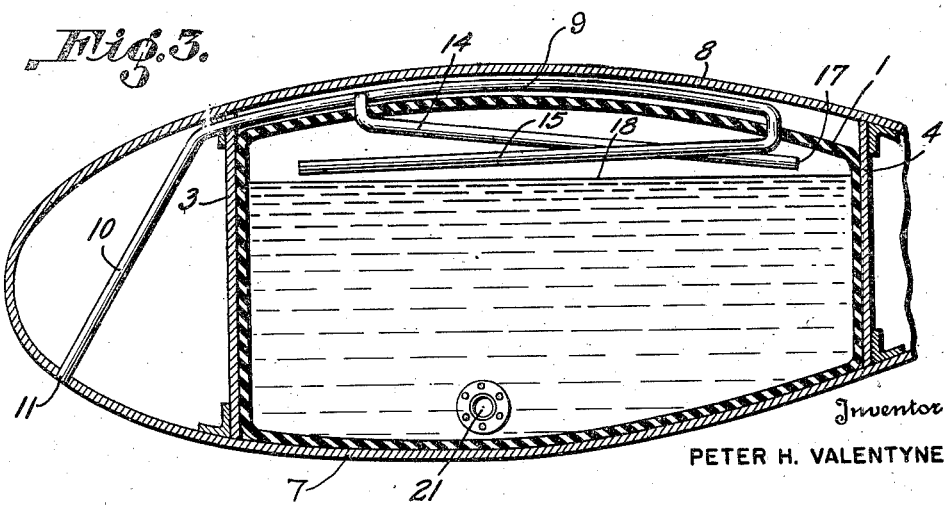
Inventor
PETER H. VALENTYNE
By Donald W. Farrington
Attorney

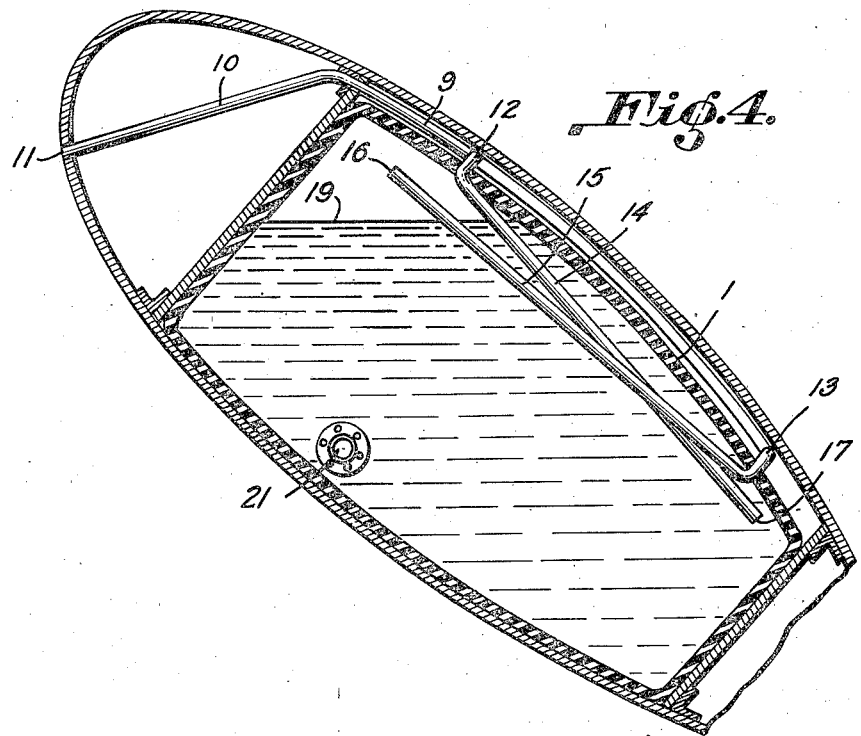
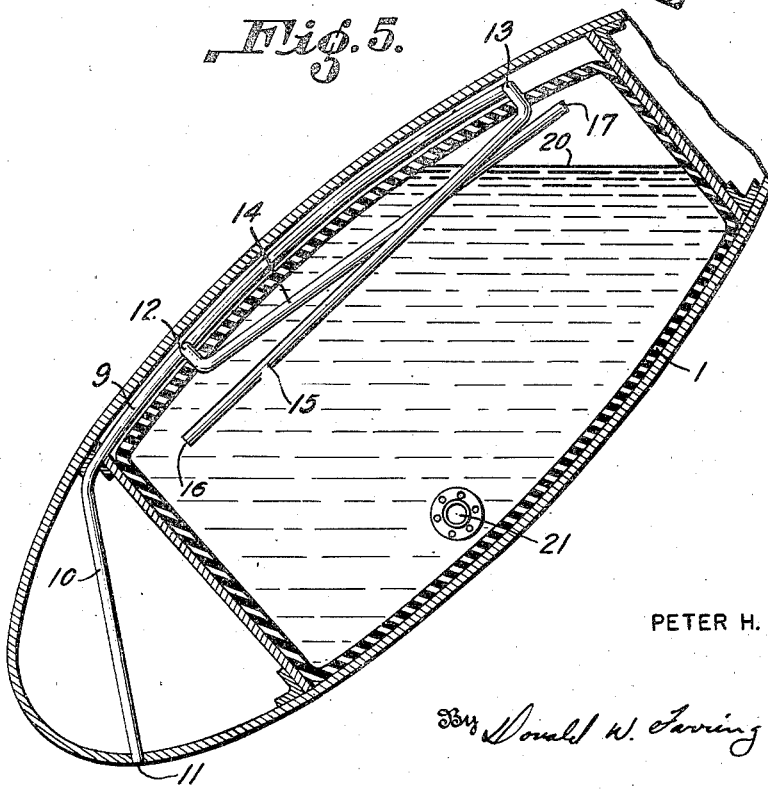

July 23, 1946.  P. H. VALENTYNE  2,404,765
SELF-LOCKING VENT SYSTEM
Filed June 12, 1945  3 Sheets-Sheet 3

Inventor
PETER H. VALENTYNE

Patented July 23, 1946

2,404,765

UNITED STATES PATENT OFFICE 2,404,765

SELF-LOCKING VENT SYSTEM

Peter H. Valentyne, Baltimore, Md., assignor to The Glenn L. Martin Company, Middle River, Md., a corporation of Maryland Application June 12, 1945, Serial No. 598,954

10 Claims. (Cl. 244—135)

This invention relates to a venting system for the gasoline storage tanks in an airplane.

A vent must be provided on every gasoline storage tank when feeding fuel to an internal combustion engine to prevent vapor lock in the system and to allow for the even flow of fuel to the engine. The vent allows the free expansion and contraction of the air and vapor in the space above the liquid level.

In gasoline storage systems employing flexible-walled liquid proof containers or cells placed in cavities in the aircraft structure such as in the wings or in the fuselage, it is even more important to have adequate venting systems because in this type of construction, if a low pressure in the cell develops by reason of the removal of fuel from the cell or by the contraction of the gas or vapor above the liquid, the cell walls are subjected to stresses for which they were not designed and they may partially collapse and unduly stress their support. It is, therefore, desirable to have a vent system so designed, particularly with the flexible-walled fuel containers, to maintain a slight positive pressure in the cell at all times.

Such a vent system must be simple and avoid valves, particularly check valves which are likely to stick and require maintenance. The vent system must function properly for all attitudes of the aircraft in flight and it must be self-locking against spilling over and syphoning gas from the tanks for the normal flight positions.

Such a vent system is provided by the present invention which employs a system of tubing without flow control, check or selector valves.

The principal object of the present invention is the provision of a vent system for an aircraft fuel storage tank which employs a system of piping so located that in any normal flight position of dive, climb or bank an open end of a vent line in the piping system will be above the level of the liquid and afford open communication with the atmosphere through a header. More than one vent line is employed and the vent lines are so arranged that for each attitude of flight one vent line will function while the rest remain inoperative. In the transition from any one vent to another, one of the vent lines will act as a syphon-break to prevent locking of the vent system.

Another object of the invention is the provision of a self-locking vent system for the fuel tanks in the airplane for all flight attitudes which includes a header on each side of the tank with vent lines connected to each header that will vent the space above the fuel level for every attitude of flight.

A further object of the invention is an arrangement of a single header between adjacent fuel tanks so that one header may vent two tanks and thereby effect a considerable saving in weight.

Further and other objects will become apparent from the description of the accompanying drawings which form a part of this disclosure and in which like numerals refer to like parts.

In the drawings:

Figure 1 is a fragmentary plan view of a fuel storage cell showing the vent system.

Figure 2 is a fragmentary sectional view taken on the line II—II of Figure 1.

Figure 3 is a fragmentary sectional view through an airplane wing in level flight showing the fuel vent system.

Figure 4 is a sectional view through an airplane wing in an attitude of maximum climb showing the vent system.

Figure 5 is a similar sectional view showing the airplane wing in an attitude of maximum dive.

Figure 6:
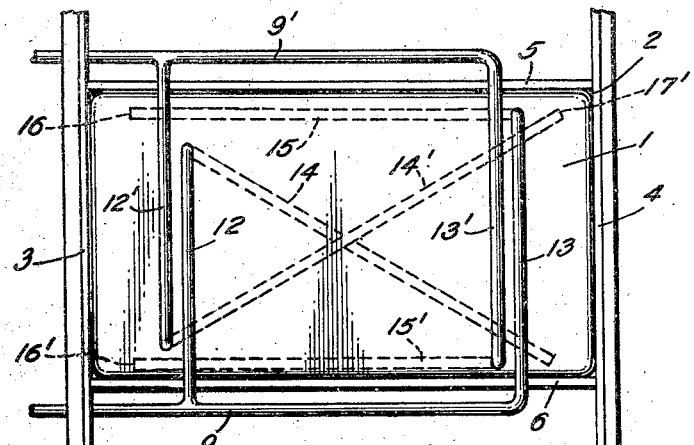
Figure 6 is a fragmentary plan view of a fuel storage cell showing a vent system for all attitudes of the airplane.

The fuel tank is placed in a cavity 2 formed between the front spar 3 and rear spar 4 in an airplane wing. The cavity side walls are formed by intermediate rib members 5 and 6 between the front and rear spars. The cavity is completed on the bottom by skin 7 and on the top by skin 8. The cells used in this construction are fluid proof bag-like structures which may be of the flexible wall type, the walls being of a rubber-like material employing either natural or synthetic rubber compounds such as that described and claimed in the Gray and Zivi Patent No. 2,102,590. This construction is now commonly used for the storage of fuel in airplanes. These cells may also be of self-sealing type, but in any event such cells must be properly vented to prevent the collapse of the cells upon the withdrawal of fluid from the cells and also to prevent vapor lock in the system and allow for expansion and contraction of the vapor in the cell above the liquid level. These are the normal functions of the vent system for any fuel storage tank.

The vent system for the tank or cell comprises a header 9 extending over the top of the cell at one side longitudinally of the airfoil. Conduit 10 connects header 9 with an orifice 11 on the underside of the leading edge of the air foil. Vent line 14 extends from opening 17 which is located above the level of the liquid in the corner at the rear of the cell near the wall adjacent header 9 to a point in the top wall of the cell located forward and near the side of the cell opposite header 9. Conduit 12 joins vent line 14 at this point and extends through the top of the cell and substantially parallel with the front spar to connect with header 9. Vent line 15 extends from opening 16 which is located in the forward upper corner on the side remote from header 9 to a point in the rear of the cell where conduit 13 connects the rear end of line 15 with header 9. It should be noted that vent lines 14 and 15 slope so that their open ends are lower than the ends attached to conduits 12 and 13 so that any liquid will drain out in the level flight position.

With the liquid in level flight position, the vent system affords open communication with orifice 11 at the leading edge of the wing. If any liquid remains in either vent line 14 or 15, it will drain out due to the slope of these lines.

In the climb position shown in Figure 4, the space above the liquid level in the tanks will be in open communication with orifice 11 through line 15, conduit 13 and header 9 and conduit 10. Opening 17 and line 14 are submerged in the liquid but since conduit 12 is located at the forward upper end of the cell, no fluid will flow into header 9. When the wing resumes level flight the liquid in conduit 14 will drain out.

For an attitude of maximum dive shown in Figure 5, opening 17, of line 14 is above the level of the liquid and affords open communication with header 9 through conduit 12 which is connected to orifice 11 by conduit 10. Opening 16 of vent line 15 is submerged by conduit 13 being located at the top rear portion of the cell, is above the liquid level and will not pass fluid into header 9. The liquid levels in the cell for right and left bank are indicated at 22 and 23. An inspection of Figure 2 will show that when the liquid in the tank stands at level 22 venting will take place through opening 16 of vent line 15 and conduit 13 to header 9. When the liquid level is as shown at 23 venting will take place through opening 17 of vent line 14 and conduit 12 to header 9.

In the foregoing description and illustration, the invention has been shown applied to wing tanks of large military or cargo airplanes in which the angles of dive, climb and bank are held to small departures from level flight. For example, the angle of dive and climb might be from 25° to 28° and the angle of slip or bank approximately 20°. In such an airplane the system shown would afford adequate venting for the fuel cells.

In the case of a more maneuverable airplane, it may be desirable to employ a self-locking fuel system such as shown in Figure 6 which insures adequate venting for every attitude of the fuel cell except inverted flight. This would double the weight of the venting system but it might be warranted for maneuverability. This vent system comprises a second header 9' located on the opposite side of the cell from header 9. Vent line 14' and 15' are located in reverse positions relative to vent lines 14 and 15 and are connected to header 9' by conduits 12' and 13'. The action of this duplicate reversed system is exactly the same except that the two systems in combination insure venting each of the upper corners of the tank and thus cover all possible high angle attitudes that the plane may assume in maneuvering.

Figure 7:
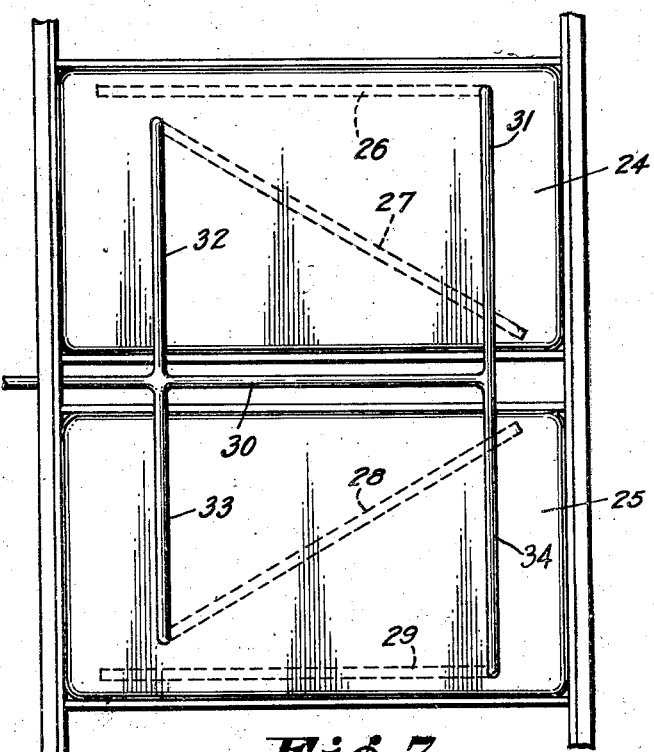
Figure 7 is a fragmentary plan view of adjacent fuel cells with a common header.

Figure 7 shows an arrangement in which adjacent tanks 24 and 25 may be vented by vent lines 26, 27, 28 and 29 connected to a common header 30 by means of conduits 31 to 34. Where several tanks are arranged in side by side relation in the wing, this common header arrangement can be used to advantage with either the single or double vent system.

It is to be understood that certain changes, alterations, modifications and substitutions can be made without departing from the spirit and scope of the appended claims.

I claim as my invention:

1. A self-locking vent system for an airplane wing storage tank to vent the tank for normal flight attitudes of the wing comprising a header pipe extending longitudinally of the wing along the top and at one side of said tank, a vent having its open end in the forward upper end of the tank on the side remote from the header pipe, said vent line extending rearwardly generally parallel to said header pipe and across the rear end of the tank to connect with said header, a second vent line having its open end in the upper rear corner of the tank on the side adjacent said header pipe, said vent line extending diagonally forwardly to the forward upper corner of the tank and then across the forward end of the tank to connect with said header.

2. A vent system for fuel storage tanks located in an airplane wing in the space formed by adjacent ribs and the front and rear spars, comprising a vent header extending from an aperture in the lower forward portion of the wing along an upper longitudinal edge of said tank, conduits extending spar-wise of said header, one along said front spar to an opening in said tank in the top, forward corner remote from said header and a vent line extending therefrom within said tank with a slight downward slope, to the upper rear corner of said tank on the side adjacent said header, and another conduit along said rear spar to an opening in the top, rear corner remote from said header and a vent line extending with a slight downward slope within said tank to the forward upper corner of the side remote from the header.

3. In an airplane wing having front and rear spars, ribs forming a compartment between said spars to accommodate a fuel storage tank, a vent header extending along an upper longitudinal edge of said tank, the forward end of the header connected to an aperture in the leading edge of the wing, a vent line within said tank, extending from the upper rear corner of said tank nearest the header to the upper forward corner remote from the header, a conduit connecting the forward end of said vent line to the forward portion of said header, a second vent line extending from the upper forward corner of said tank remote from the header to the upper rear corner on the same side of said tank, and a conduit connecting said rear end of said vent line to the rear portion of said header, said vent lines being inclined downwardly toward the open ends for drainage.

4. A self-locking vent system for normal flight attitude for a fuel storage system in the wing of an airplane including pairs of fuel storage tanks arranged side by side in said wing, a header pipe extending longitudinally of said wing along the top adjacent edges of said tanks, a vent line in each tank having its open end in the forward upper end of the tank on the side remote from the header pipe, said vent line extending rearwardly generally parallel to said header pipe and across the rear end of the tank to connect with said header, a second vent line in each tank having its open end in the upper rear corner of the tank on the side adjacent said header pipe, said vent line extending diagonally forward to the upper corner of the tank and then across the forward end of the tank to connect with said header.

5. A vent system for fuel storage cells of the flexible-walled type which are located in an airplane wing in the spaces formed by adjacent ribs and the front and rear spars, comprising a header for each cell extending from an aperture in the lower forward portion of the wing at a point of positive pressure along an upper longitudinal edge of said cell, conduits extending spar-wise of said header, one along said front spar to an opening in said cell in the top, forward corner remote from said header and a vent line extending therefrom within said cell with a slight downward slope, to the upper rear corner of said cell adjacent said header, and another conduit along said rear spar to an opening in the top, rear corner remote from said header and a vent line extending with a slight downward slope within the cell to the forward upper corner remote from the header.

6. In an airplane wing having front and rear spars, ribs forming a compartment between said spars to accommodate a fuel storage cell of the flexible walled type, a header extending along an upper longitudinal edge of said cell, the forward end of the header connected to an aperture in the leading edge of the wing at a point of positive pressure, a vent line extending from the upper rear corner of said cell nearest the header to the upper forward corner of said cell remote from the header, a conduit connecting the forward end of said vent line to the forward portion of said header, a second vent line extending from the upper forward corner of said cell remote from the header to the upper rear corner on the same side of said cell, and a conduit to connect said rear end of said vent line to the rear portion of said header.

7. A self-locking vent system for an airplane wing storage tank to vent the tank for all flight attitudes of the wing comprising header pipes extending longitudinally of the wing along the top and at each side of said tank, vent lines having their open ends in the forward upper end of the tank on the side remote from the header pipe to which it is connected, each of said vent lines extending rearwardly generally parallel to said header pipes and across the rear end of the tank to connect with said headers, other vent lines having their open end in the upper rear corner of the tank on the side adjacent the header pipe to which it is connected, said vent lines extending diagonally forwardly to the forward upper corner of the tank and then across the forward end of the tank to connect with said headers.

8. In an airplane wing having a cavity formed by the structure thereof to accommodate a fuel storage tank, a vent header extending longitudinally of said wing along an upper edge of said tank, the forward end of the header connected to an aperture in the leading edge of the wing at a point of slight positive pressure, a vent line within said tank, extending from the upper rear corner of said tank nearest the header to the upper forward corner remote from the header, a conduit connecting the forward end of said vent line to the forward portion of said header, a second vent line extending from the upper forward corner of said tank remote from the header to the upper rear corner on the same side of said tank, and a conduit connecting said rear end of said vent line to the rear portion of said header, said vent lines being inclined downwardly toward the open ends for drainage.

9. A vent system for fuel storage tanks located in an airplane wing in cavities formed therein by the wing structure, comprising a vent header extending from an aperture in the lower forward portion of the wing at a point of slightly positive pressure extending longitudinally of said wing along an upper edge of said tank, conduits extending spar-wise of said header, one along said front spar to an opening in said tank in the top, forward corner remote from said header and a vent line extending therefrom within said tank with a slight downward slope, to the upper rear corner of said tank on the side adjacent said header, and another conduit along said rear spar to an opening in the top rear corner remote from said header and a vent line extending with a slight downward slope within said tank to the forward upper corner on the side remote from the header.

10. In an airplane wing having a cavity formed in the wing by the structure thereof to accommodate a fuel storage cell of the flexible walled type, a header extending longitudinally of the wing along an upper edge of said cell, the forward end of the header connected to an aperture in the leading edge of the wing at a point of positive pressure, a vent line extending from the upper rear corner of said cell nearest the header to the upper forward corner of said cell remote from the header, a conduit connecting the forward end of said vent line to the forward portion of said header, a second vent line extending from the upper forward corner of said cell remote from the header to the upper rear corner on the same side of said cell, and a conduit to connect said rear end of said vent line to the rear portion of said header.

PETER H. VALENTYNE.